(12) United States Patent
Poupinet et al.

(10) Patent No.: US 7,776,419 B2
(45) Date of Patent: Aug. 17, 2010

(54) OPTICAL DATA STORAGE MEDIUM COMPRISING A SEMI-REFLECTIVE TIN AND TELLURIUM BASED ALLOY LAYER

(75) Inventors: Ludovic Poupinet, Sassenage (FR); Berangere Hyot, Eybens (FR); Pierre Desre, Meylan (FR)

(73) Assignees: Commissariat a l'Energie Atomique, Paris (FR); MPO International, Averton (FR)

( * ) Notice: Subject to any disclaimer, the term of this patent is extended or adjusted under 35 U.S.C. 154(b) by 450 days.

(21) Appl. No.: 11/883,817

(22) PCT Filed: Feb. 24, 2006

(86) PCT No.: PCT/FR2006/000429

§ 371 (c)(1),
(2), (4) Date: Aug. 7, 2007

(87) PCT Pub. No.: WO2006/092483

PCT Pub. Date: Sep. 8, 2006

(65) Prior Publication Data

US 2009/0181205 A1    Jul. 16, 2009

(30) Foreign Application Priority Data

Mar. 3, 2005    (FR) .................... 05 02149

(51) Int. Cl.
*B32B 3/02*    (2006.01)
(52) U.S. Cl. .................... 428/64.1; 428/64.4; 428/64.5; 430/270.12
(58) Field of Classification Search .......... None
See application file for complete search history.

(56) References Cited

U.S. PATENT DOCUMENTS

| 4,947,372 | A | 8/1990 | Koshino et al. |
| 6,663,934 | B2 * | 12/2003 | Nagata et al. ............. 428/64.1 |
| 2003/0090991 | A1 | 5/2003 | Poupinet et al. |
| 2005/0254407 | A1 * | 11/2005 | Hwang et al. ............ 369/275.1 |
| 2006/0056277 | A1 | 3/2006 | Poupinet et al. |

FOREIGN PATENT DOCUMENTS

| EP | 0 350 078 A1 | 1/1990 |
| EP | 1 102 252 A2 | 5/2001 |
| EP | 1 359 575 A2 | 11/2003 |
| EP | 1526522 | * 4/2005 |
| JP | A 61-168142 | 7/1986 |

(Continued)

OTHER PUBLICATIONS

M. Terao et al., "Chalcogenide Thin Films for Laser-Beam Recordings by Thermal Creation of Holes", J. Appl. Phys. vol. 50, No. 11, Nov. 1979, pp. 6881-6886.

*Primary Examiner*—Elizabeth Mulvaney
(74) *Attorney, Agent, or Firm*—Oliff & Berridge, PLC

(57) ABSTRACT

An optical data storage medium comprises at least one active layer of inorganic material, that is able to undergo local deformations during write operations. The active layer presents a front face which is designed to receive an optical radiation at least during read operations. The support also comprises a thin tin and tellurium based alloy layer forming a semi-reflective layer disposed on the front face of the active layer.

15 Claims, 3 Drawing Sheets

FOREIGN PATENT DOCUMENTS

| | | |
|---|---|---|
| JP | A 63-160029 | 7/1988 |
| JP | A 3-088144 | 4/1991 |
| JP | A 7-021585 | 1/1995 |
| JP | A 2004-071025 | 3/2004 |
| WO | WO 01/93256 | 12/2001 |
| WO | WO 2004/006228 A2 | 1/2004 |
| WO | WO 2004/053858 | 6/2004 |

* cited by examiner

OPTICAL DATA STORAGE MEDIUM COMPRISING A SEMI-REFLECTIVE TIN AND TELLURIUM BASED ALLOY LAYER

BACKGROUND OF THE INVENTION

The invention relates to an optical data storage medium comprising:
an active layer of inorganic material, that is able to undergo local deformations during write operations and presenting a front face designed to receive an optical radiation during at least read operations,
and a semi-reflective layer disposed on the front face of the active layer.

STATE OF THE ART

Optical recording, for example on CD-R (Compact Disc-Recordable) and DVD-R (Digital Versatile Disc-Recordable) type media, is in most cases performed by means of a layer of colorant material deposited on a plastic substrate and covered by a reflective metal layer. However, irreversible optical recording technologies in colorant materials sometimes present high production costs, in particular with respect to the price of the colorants and to labour costs for the colorant handling steps.

In the 80's, a great deal of research was carried out on the formation of marks in inorganic materials by laser ablation, the presence of the mark then resulting in a local decrease of the reflection of a laser beam at the surface of the disc. The inorganic materials studied at this time are for example tellurium and alloys containing arsenic, antimony, selenium and sulphur. However, in most of the studies and in particular in the article "Chalcogenide thin films for laser-beam recordings by thermal creation of holes" by M. Terao et al. (J. Appl. Phys. 50 (11), November 1979), the powers used were comprised between 40 mW and 300 mW and the size of the marks was about 10 µm. These powers and mark sizes however no longer correspond to current write specifications. The write powers used to record data on a DVD-R have in fact to be about 10 mW and the diameter of a mark has to be about 400 nm.

Moreover, with such inorganic materials, a protective layer, for example made of polymer, often has to be deposited on the recording medium. However, the presence of a protective layer generally causes an impairment of the quality of the signals and an increase of the write power. Thus, many materials have been studied, but few of them enable good quality write to be achieved. Furthermore, they do not enable the storage densities required for the DVD-R format to be achieved. This is why, in spite of their high production cost, colorants have imposed themselves for this standard.

At the present time, some people propose performing optical data recording in a medium comprising an active layer of inorganic material by means of a blue laser diode. The narrowness of the focused laser beam does in fact enable a higher power density to be obtained than in previous generations of optical discs (CD-R and DVD-R). This makes it possible to progress beyond the usual limit of inorganic materials, i.e. a relative insensitivity compared with organic discs. Another write technique using deformation of the layers in the form of bubbles instead of holes also enables lower powers to be used.

To obtain a recording medium comprising an inorganic active layer whereby a resolution of the marks and a storage density corresponding to the DVD format specifications can be achieved, it has been proposed in Patent application WO-A-2004/053858 to use an active layer of tellurium and zinc alloy. The active layer comprises a front face designed to receive an optical radiation, such as a laser, enabling a write mechanism by mechanical deformation for example in the form of holes or bubbles. A metal semi-reflective layer may be disposed on the front face of the active layer.

The Patent application WO-A-01/93256 specifies the advantage to be gained from a semi-reflective layer when the latter is disposed on the front face of an active layer of inorganic material that is able to deform locally during write operations. The semi-reflective layer is formed by a metal selected from the group comprising aluminium, silver, copper, gold, zinc, titanium and their alloys. Its presence on the front face of the active layer enables the value of the reflection coefficient of the recording medium to be increased without excessively increasing the write threshold. When the active layer is not deformed, it does in fact generally present a certain reflection coefficient, but this is not sufficient to obtain a large difference between said reflection coefficient and the reflection coefficient of the deformed zones of the active layer after a write operation. Data recording by local deformation of the active layer and possibly of the semi-reflective layer does in fact have the effect of locally reducing the reflection coefficient of the stack formed by the active layer and the semi-reflective layer.

However, although the metals or alloys used to form the semi-reflective layer are good thermal conductors, they can not be used in thick layers without inducing a reduction of sensitivity, and when they are used in thin layers, they generally lose their metallic properties and/or they are more easily impaired, in particular by oxidation or by sulfidation.

Furthermore, the inorganic materials used up to now in the context of writing by formation of holes or bubbles have a relatively weak reflection, often less than 40%. This stems in particular from their electron configuration on the one hand, and also from the amorphous structure they present after they have been deposited. The same materials, once crystallized, present a higher reflection, but they require a transition step from the amorphous state to the crystalline state, which requires use of an initializer. The use of an initializer, which is commonplace in re-recordable discs, does however remain too expensive for irreversible recording media.

OBJECT OF THE INVENTION

The object of the invention is to remedy the shortcomings of the prior art and more particularly to propose an optical recording medium presenting initial reflection of a read optical radiation and a partial absorption of a write optical radiation, corresponding to the international standard specifications, in particular in the case of a DVD medium.

According to the invention, this object is achieved by the appended claims.

More particularly, this object is achieved by the fact that the semi-reflective layer is a thin layer of tin and tellurium based alloy.

The alloy can be a tin and tellurium alloy or it can be an alloy of tin, tellurium and a metal selected from zinc and indium.

According to a development of the invention, the inorganic material of the active layer is a tellurium and zinc alloy.

According to a particular embodiment, the inorganic material of the active layer is a tellurium and zinc alloy, the active layer and the semi-reflective layer preferably forming a stack having a thickness of less than or equal to 80 nm. More particularly, the semi-reflective layer and the active layer each have a thickness of about 20 nm.

BRIEF DESCRIPTION OF THE DRAWINGS

Other advantages and features will become more clearly apparent from the following description of particular embodiments of the invention given as non-restrictive examples only and represented in the accompanying drawings in which.

DESCRIPTION OF PARTICULAR EMBODIMENTS

Figure 1:
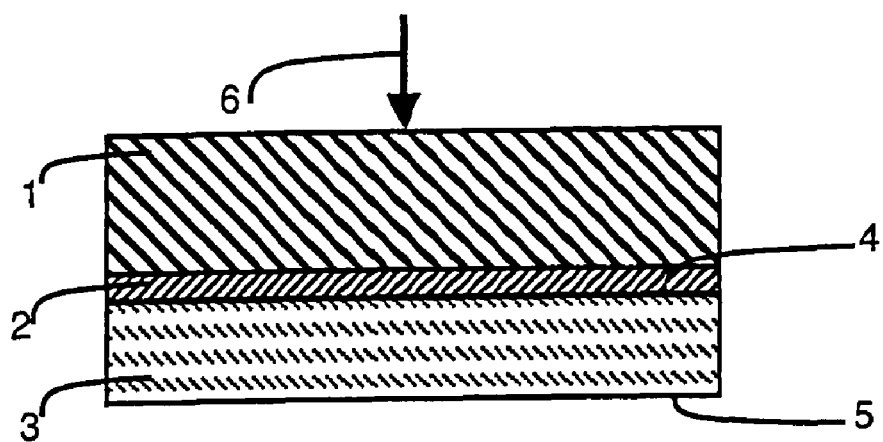
FIG. 1 represents a particular embodiment of an optical recording medium according to the invention.

As represented in FIG. 1, an optical data recording medium, preferably irreversible, comprises a substrate 1, for example made of polycarbonate, whereon a semi-reflective layer 2 and an active layer 3 are successively disposed.

The stack formed by the active layer 3 and the semi-reflective layer 2 preferably has a thickness of less than or equal to 80 nanometers and preferably less than or equal to 50 nm. More particularly, according to a preferred embodiment, the semi-reflective layer 2 and the active layer 3 each have a thickness of about 20 nm.

The active layer 3 is made of inorganic material. It is preferably made of zinc and tellurium alloy (Zn—Te). It presents a front face 4 in contact with the semi-reflective layer 2 and a free rear face 5. It is able to undergo local deformations during write operations and its front face 4 is designed to receive an optical radiation 6 during at least read operations. The local deformations undergone by the active layer are preferably deformations in the form of bubbles, caused by the action of a write optical radiation received by the front face 4 of the active layer 3. The semi-reflective layer 2 can also be deformed by the deformation action of the active layer. The write optical radiation is for example a focused laser beam.

The semi-reflective layer 2 is composed of a tin and tellurium based alloy. It is for example made of tin telluride (Sn—Te) also called tin and tellurium alloy or tin and tellurium compound. Preferably, in the Sn—Te alloy, the atomic percentage proportion of tin is comprised between 40% and 60%, and, more particularly between 45% and 55%. The atomic percentage proportion of tellurium in said alloy being complementary to that of the tin, it is preferably comprised between 60% and 40% and more particularly between 55% and 45%. Thus, a privileged composition of the Sn—Te alloy, in atomic percentages, is 50% of tin and 50% of tellurium.

The presence of a semi-reflective layer of tin and tellurium based alloy enables the reflection coefficient of the recording medium to be improved. Indeed, when the recording medium only comprises an active layer of inorganic material, for example of ZnTe, the reflection of the recording medium is about 20% to 30%. International standards do however require DVD-R type media to have an initial reflection of at least 45%. This reflection is dependent on the geometry of the substrate, which can be responsible for losses by diffraction, and the optical properties of materials deposited on this substrate. Furthermore, as data writing is linked to partial absorption of an optical radiation by one the layers deposited on the substrate and in particular by the active layer, the absorption of the medium must be at least more than 30%.

To be efficient, the semi-reflective layer having to be disposed on the front face of the active layer must in practice have a refraction index n and an absorption coefficient k respecting the following specifications:

$(n-4)^2 + k^2 > 12.25$ $(n-8)^2 + (k+1)^2 > 12.25$ $(n-7)^2 + k^2 < 42.25$ n and k must be positive n must be less than 8.

Figure 2:
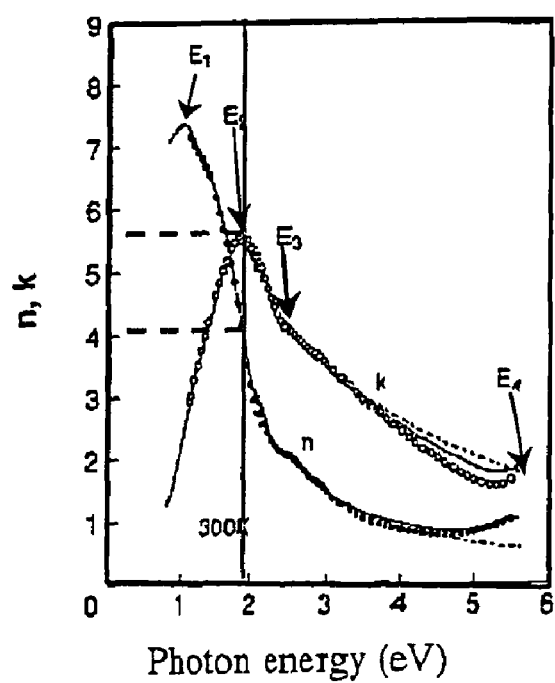
FIG. 2 represents the variations of the refraction index (n) and of the absorption coefficient (k) of a Sn—Te alloy versus the photon energy (eV).

FIG. 2 represents the theoretic variation of the refraction index n and of the absorption coefficient k of the Sn—Te alloy in crystallized form, versus the photon energy. It can be observed that at an energy value of 2 eV, an energy value corresponding approximately to the wavelength used in known manner for write and read operations in a DVD-R type medium, the Sn—Te alloy presents a very high refraction index of about 4, and a maximal absorption coefficient of about 5.5. The refraction index n and the absorption coefficient k of the Sn—Te alloy therefore verify the specifications mentioned above. Said alloy can therefore be used to form a semi-reflective layer disposed on the front face of an active layer of a recording medium.

Figure 3:
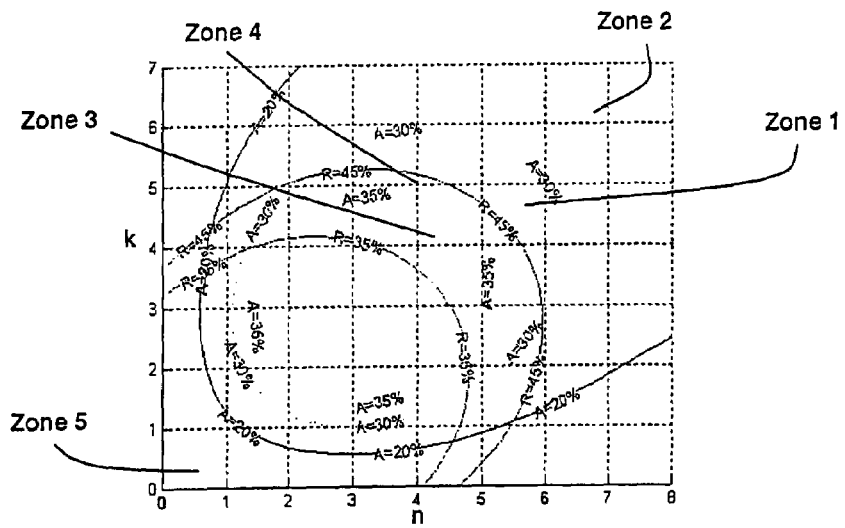
FIGS. 3 to 5 represent the iso-values of the reflection and absorption for different values of refraction index (n) and absorption coefficient (k) for a thin layer respectively of 20, 30 and 40 nm.
Figure 4:
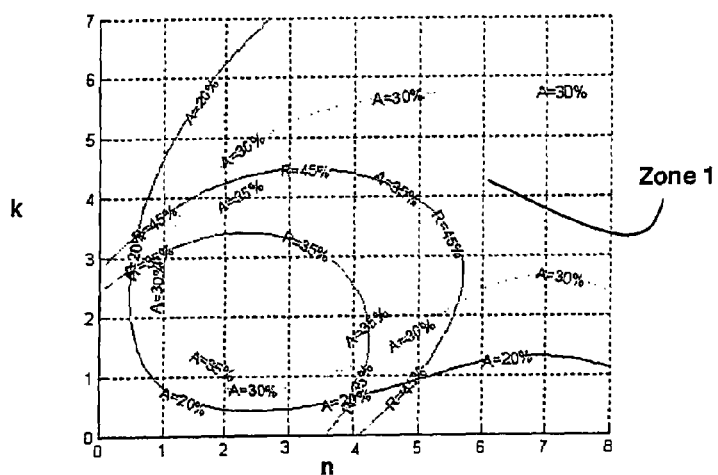
Figure 5:
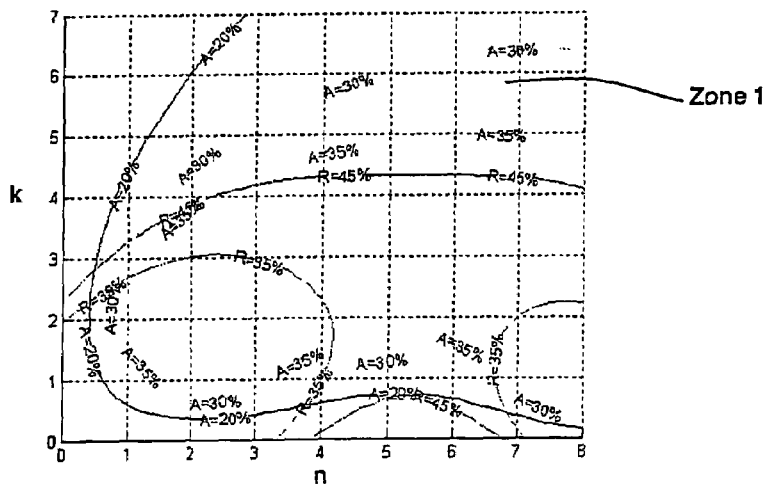

Furthermore, FIGS. 3 to 5 represent the iso-values of the reflection and absorption for different refraction index n and absorption coefficient k values of a thin layer respectively having a thickness of 20, 30 and 40 nm. In FIGS. 3 to 5, the different zones 1 represented correspond to refraction index n and absorption coefficient k zones in which the absorption is greater than 30% and the reflection is at least 45%. In FIG. 3, zones 2 to 5 are also represented for indication purposes. In zone 2, the reflection is at least 45% but the absorption is comprised between 20 and 30%, whereas in zone 3 the reflection is comprised between 35% and 45% but the absorption is greater than 35%. In zone 4, the reflection is comprised between 35% and 45% and the absorption is comprised between 20% and 35%, whereas in zone 5 the reflection and absorption are too low. Zone 1 therefore represents the ideal zone in which a DVD type recording medium has to be placed to meet the requirements of international standards.

Figure 6:
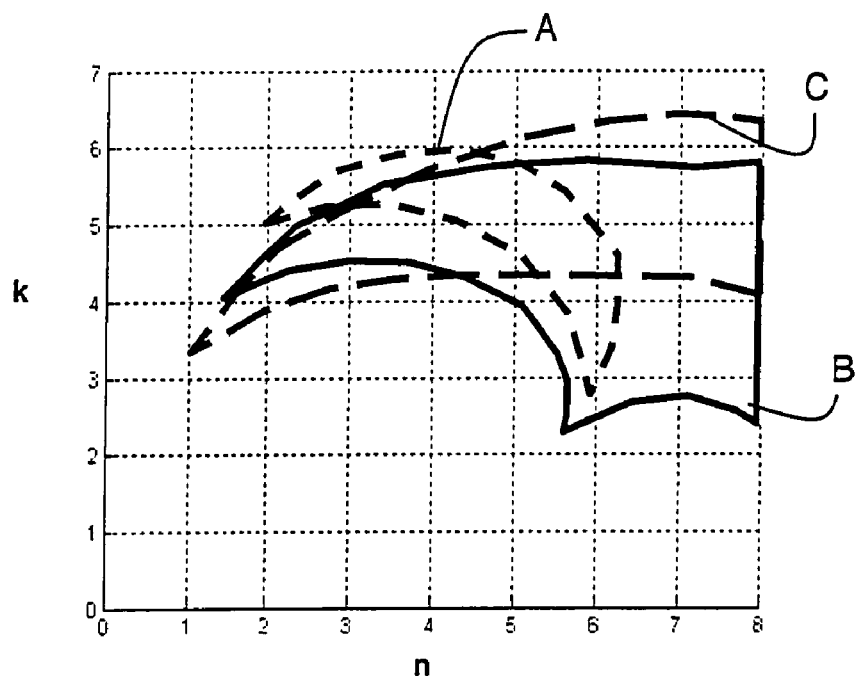
FIG. 6 schematically illustrates the different zones 1 represented in FIGS. 3 to 5, on a single graph.

FIGS. 3 to 5 however show that the reflection and absorption iso-value curves vary according to the thickness of the thin layer. Thus, FIG. 6 represents the different zones 1 represented in FIGS. 3 to 5, on a single graph, respectively for a layer with a thickness of 20, 30 and 40 nm. Curve A thus represents zone 1 according to FIG. 3 whereas curves B and C respectively represent zones 1 according to FIGS. 4 and 5.

It can then be observed that, for an energy value of 2 eV, the refraction index n and the absorption coefficient k of the Sn—Te alloy are always situated in a zone 1, whatever the thickness of the thin layer of Sn—Te alloy. Thus, unlike the inorganic materials usually used in recording media, the optical properties of the Sn—Te alloy enable the international standard specifications for the DVD-R in terms of reflection and absorption to be complied with, whatever the thickness of said thin layer.

Moreover, to find a material situated in zones 1 represented in FIGS. 3 to 5, it is generally usual to look for materials presenting abnormal optical properties, close to the absorption bands, and one of the possible paths is to select a material presenting a gap close to the working wavelength, i.e. a wavelength corresponding to 2 eV. It can however be observed in FIG. 2 that the absorption coefficient k of the Sn—Te alloy progresses relatively slowly above the gap energy and that the interest of the Sn—Te material lies in a critical point E2 close to the working wavelength, which results in a very small gap.

A semi-reflective layer of tin and tellurium alloy therefore enables a recording medium to be obtained presenting initial reflection of a read optical radiation and partial absorption of a write optical radiation, corresponding to international standard specifications, in particular in the case of a DVD medium. In addition, it does not present the drawbacks of semi-reflective metallic thin layers described in the document WO-A-01/93256.

In the document WO-A-01/93256, the thickness of the semi-reflective metallic layer, for example made of aluminium, gold, silver, copper, zinc, titanium, nickel or one of their alloys, is in fact adjusted to the optimum to increase the reflection of the recording medium without excessively increasing the write threshold. Its thickness is thus about 4 nm to 10 nm so as to limit its thermal conductivity. Too high a thermal conductivity would in fact lead to a decrease of the sensitivity of the recording medium.

Unlike the document WO-A-01/93256, the use of a tin and tellurium based alloy and more particularly of a Sn—Te alloy to form the semi-reflective layer 2 notably enables the thickness of the semi-reflective layer 2 to be substantially increased, more particularly up to a thickness of about 20 nm. This enables the reflection of the recording medium to be improved. However, the semi-reflective layer 2 keeps a moderate thermal conductivity, which enables an acceptable sensitivity of the recording medium to be obtained.

Furthermore, the tin- and tellurium-based alloy also presents the advantage of having a crystallization temperature lower than 0° C. Thus, when a deposition operation is performed, the thin layer of tin and tellurium based alloy is already in crystalline form, which also enables a high reflection to be obtained. In addition, as the tin and tellurium based alloy is very stable, it does not undergo any chemical degradation. Finally, unlike the materials used in the prior art, the tin and tellurium based alloy enhances local deformations in the form of bubbles during write operations. The behavior of the semi-reflective metallic layers used in the prior art is in fact mechanically more favorable to formation of holes than to that of bubbles. Recording by formation of bubbles is however privileged as it enables higher data storage densities to be had than recording obtained by formation of holes.

Finally, certain metals used to form the thin semi-reflective metallic layers described in the document WO-A-01/93256 in general present the drawback of being sensitive to oxidation and/or to sulfidation. A semi-reflective layer of tin and tellurium based alloy on the other hand presents the advantage of being stable.

The invention is not limited to the embodiments described above. Thus, the thin layers of the recording medium can be arranged within the medium in a different order to enable an optical radiation 6 to reach the active layer 3 on the opposite side to the substrate 1. Thus in FIG. 7, the polycarbonate substrate 1 is successively covered by the active layer 3, the semi-reflective layer 2, a layer of glue 7 and a protective support 8, for example made of polycarbonate. The front face 4 and rear face 5 of the active layer 3 are then respectively in contact with the semi-reflective layer 2 and the substrate 1, in such a way that the optical radiation 6 coming from the free face of the protective support 8 always reaches the active layer via the front face 4 of the latter. The layer of glue 7 is preferably a layer of glue that is able to deform. It thus accompanies deformation of the layers, respectively the active layer 3 and semi-reflective layer 2, due to the action of an write optical radiation 6 coming from the free face of the protective support 8.

Figure 7:
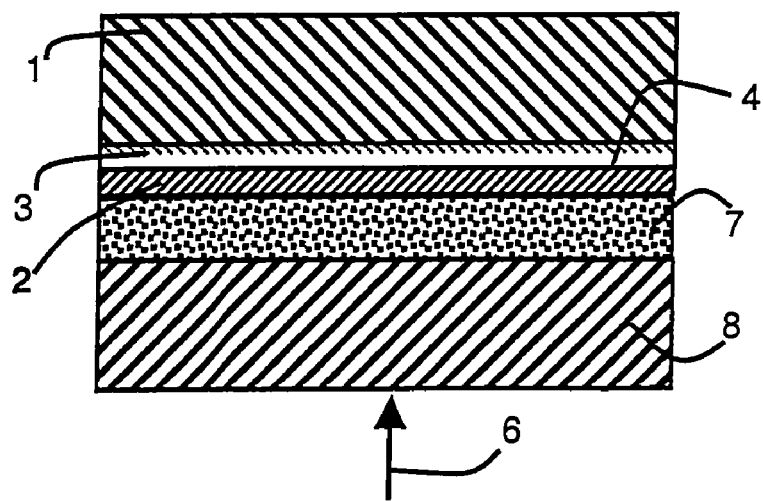
FIG. 7 represents an alternative embodiment of an optical recording medium according to FIG. 1.

For example, in the mode particular embodiment represented in FIG. 7, the active layer 3 is made of zinc and tellurium alloy with 65% atomic percentage of zinc and 35% atomic percentage of tellurium, whereas the semi-reflective layer 2 is made of tin and tellurium based alloy. The active layer 3 and the semi-reflective layer 2 each for example have a thickness of 20 nm whereas the substrate 1 has a thickness of 0.6 mm and the thickness of the layer of glue 7 is about a few tens of micrometers.

The write optical radiation, for example a focused laser beam, received by the front face of the active layer to form local deformations in the active layer can also be replaced by any other type of means such as heating means. For example, the local deformations can be caused by heating caused by micro-tips or by Joule effect.

The binary alloy based on tin and tellurium can be advantageously replaced by a ternary alloy formed by tin, tellurium and a metal selected from zinc and indium. The tin, tellurium and zinc alloy and the tin, tellurium and indium alloy are respectively noted $(SnTe)_xZn_{1-x}$ and $(SnTe)_xIn_{1-x}$. The value of the parameter x is preferably greater than or equal to 90%. In this case, the atomic proportion of the metal selected from zinc and indium in the ternary alloy is less than or equal to 10%.

The invention claimed is:

1. An optical data storage medium comprising:
    an active layer of inorganic material, that is able to undergo local deformations during write operations and presenting a front face designed to receive an optical radiation during at least read operations,
    and a semi-reflective layer disposed on the front face of the active layer, wherein the semi-reflective layer is a thin layer of an alloy of tin, tellurium and a metal selected from zinc and indium.

2. The medium according to claim 1, wherein the alloy has a proportion of the metal selected from zinc and indium, in atomic percentage, of less than or equal to 10%.

3. The medium according to claim 1, wherein the active layer is able to undergo local deformations caused by heating means.

4. The medium according to claim 1, wherein the active layer is able to undergo local deformations caused by the action of a write optical radiation received by the front face of the active layer.

5. An optical data storage medium comprising:
    an active layer of tellurium and zinc alloy, that is able to undergo local deformations during write operations and presenting a front face designed to receive an optical radiation during at least read operations,
    and a semi-reflective layer disposed on the front face of the active layer, wherein the semi-reflective layer is a thin layer of tin and tellurium based alloy.

6. The medium according to claim 5, wherein the alloy is a tin and tellurium alloy.

7. The medium according to claim 6, wherein the tin and tellurium alloy has a proportion of tin, in atomic percentage, comprised between 40% and 60%.

8. The medium according to claim 7, wherein the tin and tellurium alloy has a proportion of tin, in atomic percentage, comprised between 45% and 55%.

9. The medium according to claim 5, wherein the active layer is able to undergo local deformations caused by heating means.

10. The medium according to claim 5, wherein the active layer is able to undergo local deformations caused by the action of a write optical radiation received by the front face of the active layer.

11. An optical data storage medium comprising:
an active layer of inorganic material, that is able to undergo local deformations during write operations and presenting a front face designed to receive an optical radiation during at least read operations,
and a semi-reflective layer disposed on the front face of the active layer, wherein the semi-reflective layer is a thin layer of tin and tellurium based alloy, and
wherein the active layer and the semi-reflective layer form a stack having a thickness less than or equal to 80 nm.

12. The medium according to claim 11, wherein the stack has a thickness less than or equal to 50 nm.

13. The medium according claim 11, wherein the semi-reflective layer and the active layer each have a thickness of about 20 nm.

14. The medium according claim 11, wherein the active layer is able to undergo local deformations caused by heating means.

15. The medium according claim 11, wherein the active layer is able to undergo local deformations caused by the action of a write optical radiation received by the front face of the active layer.

* * * * *